H. L. VAN VALKENBURG.
MOTOR STARTING SWITCH.
APPLICATION FILED JULY 25, 1918.

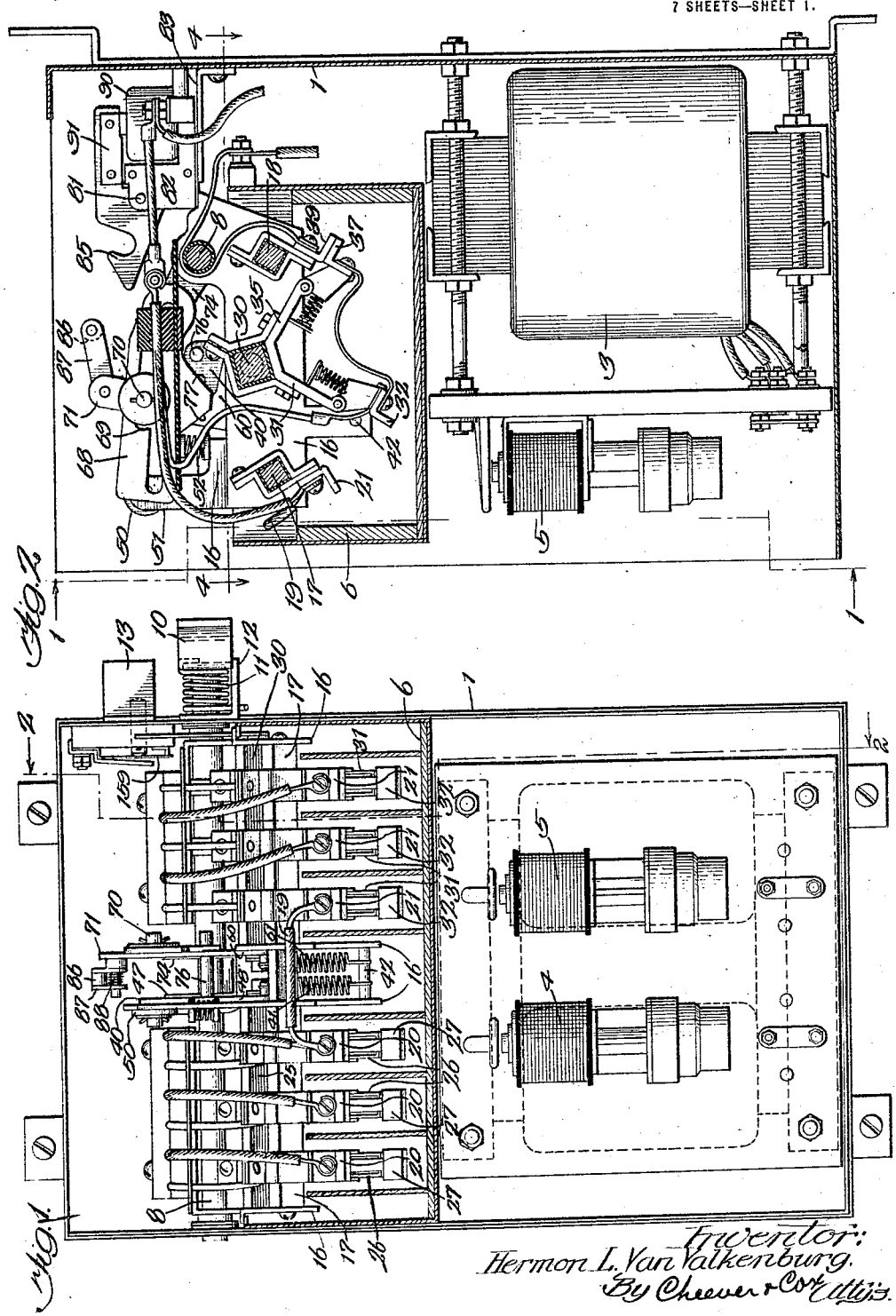

1,420,789.

Patented June 27, 1922.

Inventor:
Hermon L. Van Valkenburg.
By Cheever & Cox Attys

H. L. VAN VALKENBURG.
MOTOR STARTING SWITCH.
APPLICATION FILED JULY 25, 1918.

1,420,789.

Patented June 27, 1922.

Inventor:
Hermon L. Van
Valkenburg.
By Cheever & Cox
Attys.

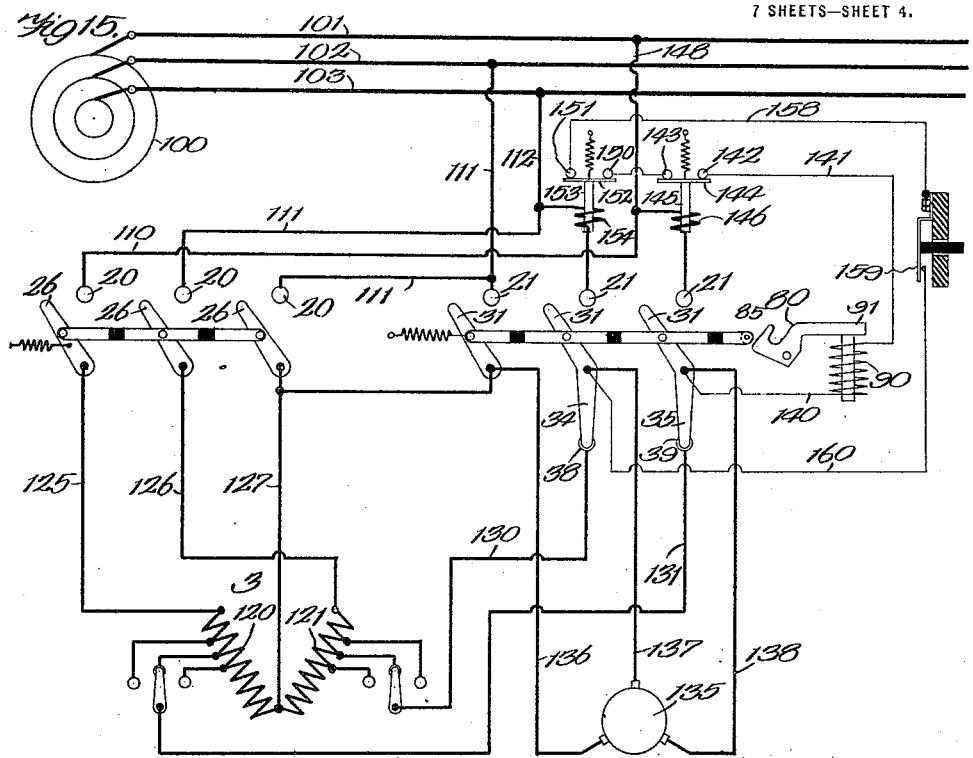

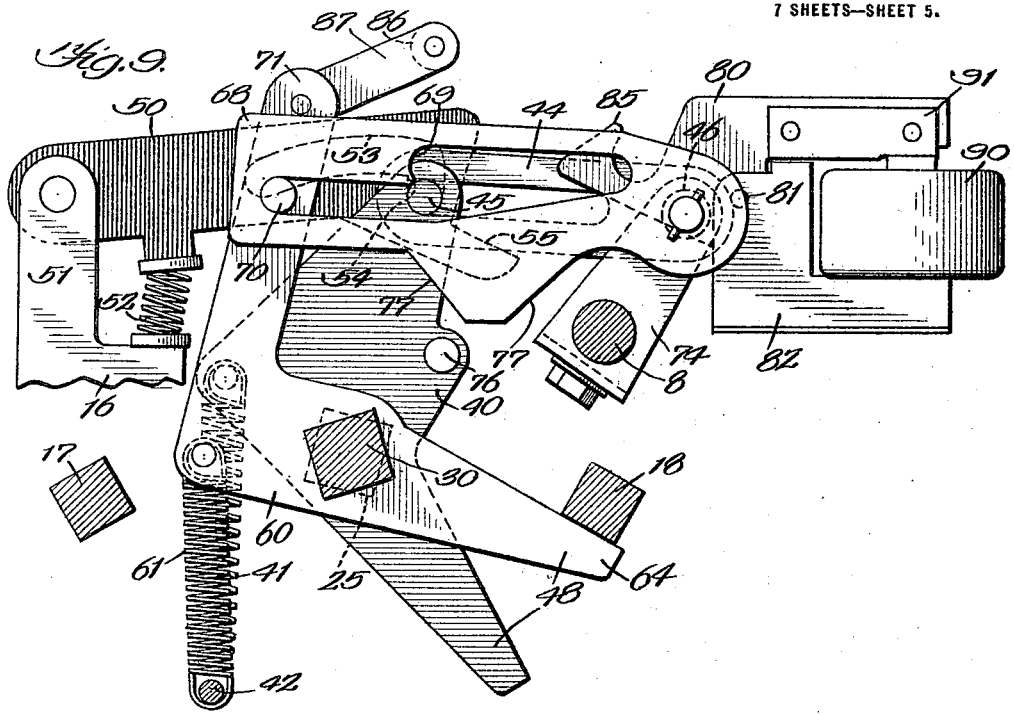

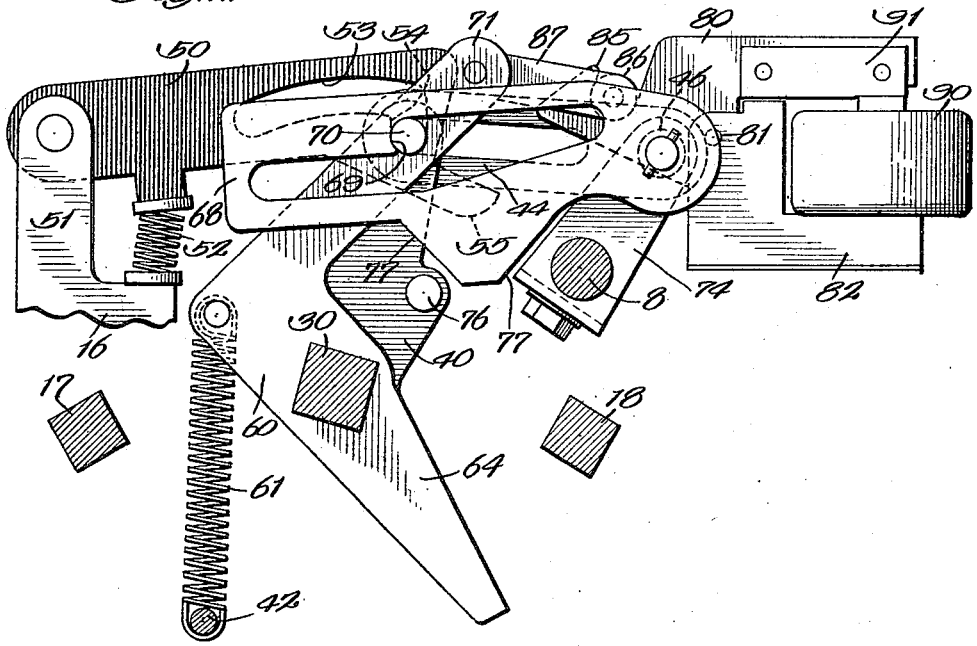
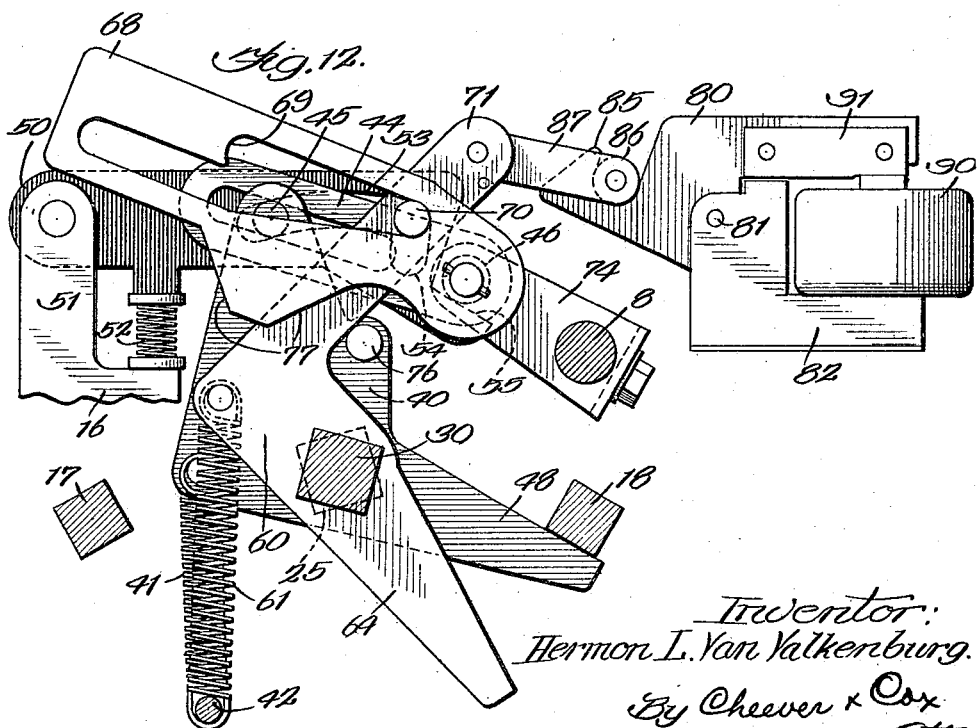

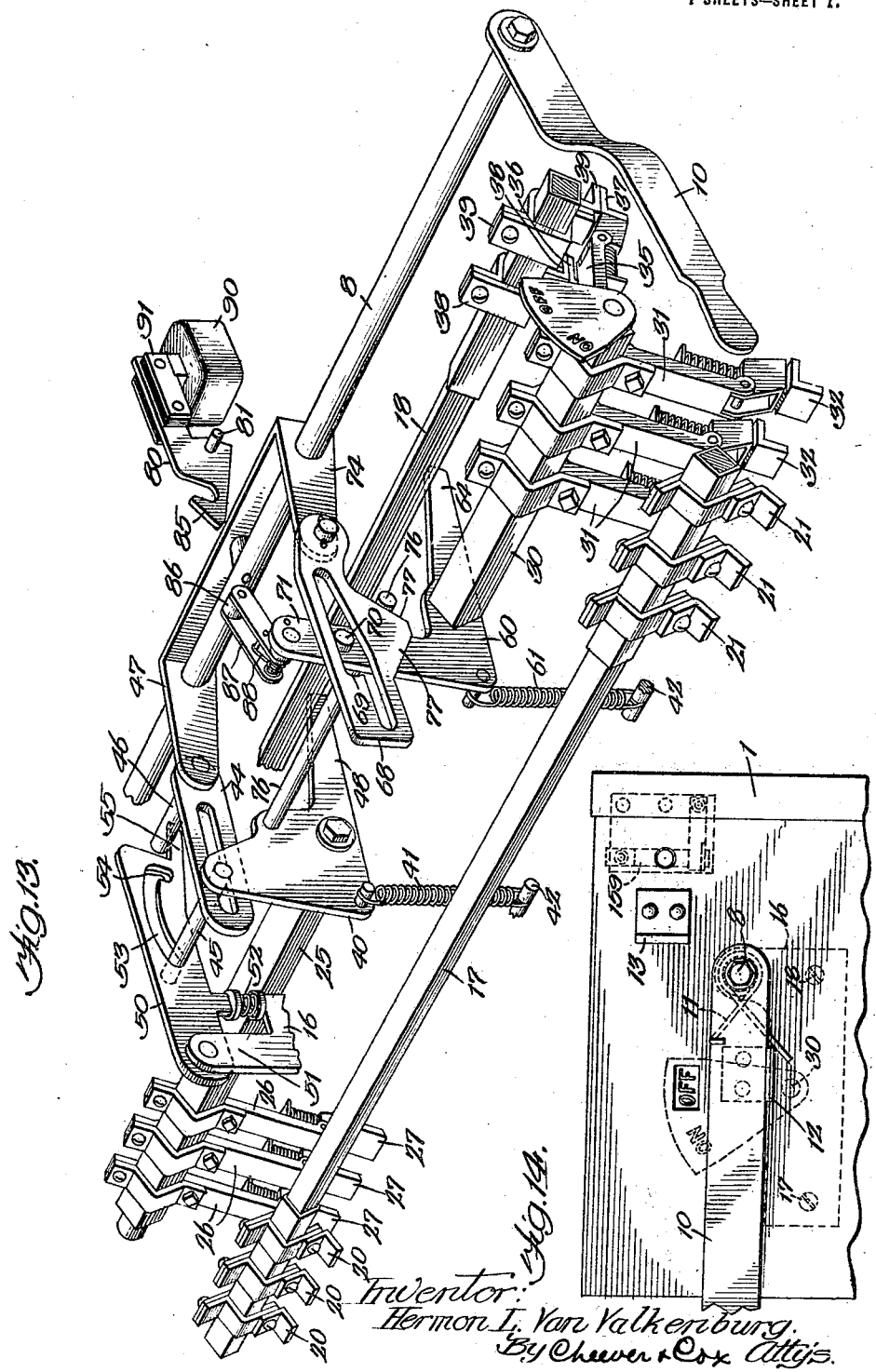

UNITED STATES PATENT OFFICE.

HERMON L. VAN VALKENBURG, OF MILWAUKEE, WISCONSIN, ASSIGNOR TO INDUSTRIAL CONTROLLER COMPANY, OF MILWAUKEE, WISCONSIN, A CORPORATION OF WISCONSIN.

MOTOR-STARTING SWITCH.

1,420,789.    Specification of Letters Patent.    Patented June 27, 1922.

Application filed July 25, 1918. Serial No. 246,635.

*To all whom it may concern:*

Be it known that I, HERMON L. VAN VALKENBURG, a citizen of the United States, residing at Milwaukee, in the county of Milwaukee and State of Wisconsin, have invented a certain new and useful Improvement in Motor-Starting Switches, of which the following is a specification.

My invention relates to motor starting switches and is especially useful as a hand operated compensator.

In operating electric motors, especially of the larger types, good practice requires that the full line voltage should not be thrown on while the rotor is standing still, but that an element of some kind should be temporarily introduced into the motor circuit so as to give the motor time to develop a certain amount of counter electromotive force. My invention is intended primarily for alternating current motors and in the form shown is designed for a polyphase system. In the illustrated design the reactance is in the form of an autotransformer. In my device there is a starting switch for connecting the motor to the supply circuit through the autotransformer or reactance, and a running switch for connecting the motor directly to the supply circuit under normal running conditions. The general object of the invention is to provide improved means for operating the switches in the proper sequence and preventing their operation in any but the proper sequence. Another object is to correlate the switch operating mechanism with protective devices for opening the motor circuit in case of overload or in case of low voltage in the supply circuit. Contributory objects will become apparent in the following description:

In carrying out my invention, according to the present design an operating handle is provided which has a spring constantly urging it toward initial position. When the handle is moved forward a proper distance from initial position it closes the starting switch and enables a detent to take hold of it and maintain it closed. The handle is then permitted to move part way back toward initial position, whereupon it picks up the running switch so that when the handle is moved forward a second time, it will close the running switch. When the running switch has been closed, a detent engages it, thereby permitting the operating handle to be returned by its spring to initial position without opening the running switch. Just before the handle reaches initial position on the backward movement it trips the first detent and permits the starting switch to open. Thus the operator must first move the handle forward a proper distance, then let it move backward a proper distance, and then move it forward again before the starting switch can be closed. As soon as he takes his hand off the operating handle it will automatically return to initial position, and in so doing it moves to non acting position the detent which holds the starting switch closed. As the starting switch is spring pressed toward open position, it automatically opens as soon as it is thus released from its detent. In other words, the starting switch is automatically tripped as the operating handle approaches initial position for the second time. Consequently, the motor is first energized through the starting switch, and then through the running switch. The detent which holds the running switch closed is controlled electromagnetically. It releases on either overload, low voltage or manually.

I obtain my objects by the mechanism illustrated in the accompanying drawings in which Figure 1 is a front elevation of the complete apparatus taken on the line 1—1 Figure 2.

Figure 2 is a side elevation on the line 2—2, Figure 1.

Figures 8 to 12 inclusive, are views showing changed positions of the switch operating mechanism.

Figure 13 is a perspective showing the switch operating mechanism. In this figure the parts are separated sideways and some of the shafts and pins extended to better reveal the construction and theory of operation. In this sense the figure is diagrammatic, for in the actual structure the mechanism is more compact.

Figure 14 is a side view of a portion of the outer casing showing the indicating mechanism whereby the operator may determine without opening up the casing whether the running switch is open or closed.

Figure 15 is a wiring diagram showing the electrical connections.

Similar numerals refer to similar parts throughout the several views.

Figure 3:
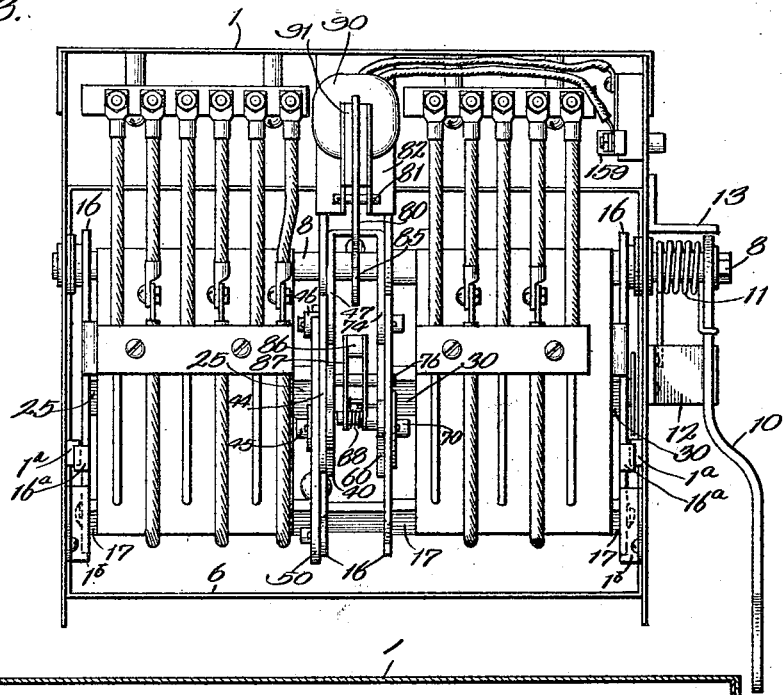
Figure 3 is a top plan view of the apparatus with the cover removed.
Figure 4:
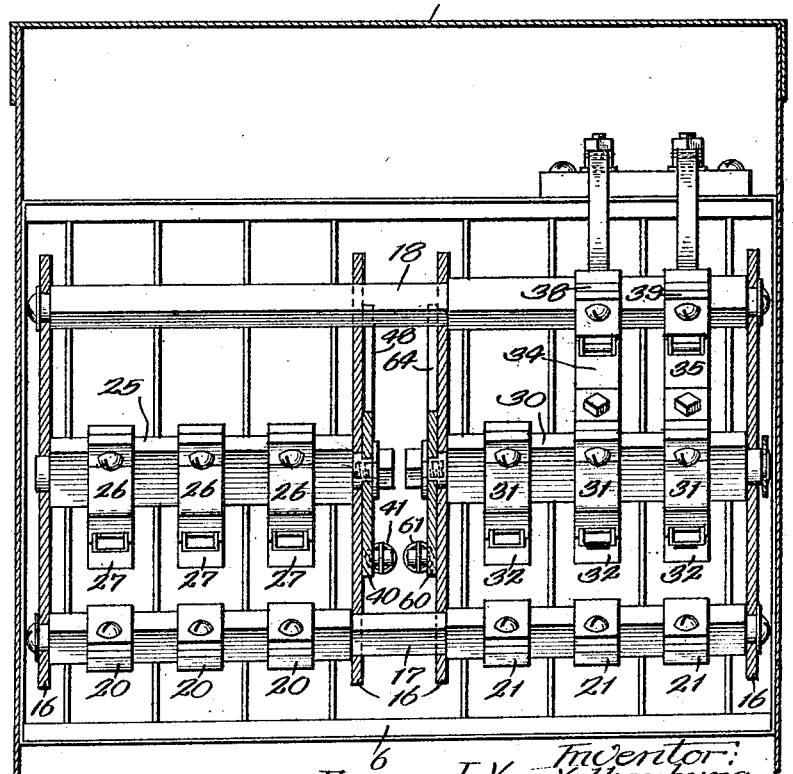
Figure 4 is a plan section on the line 4—4, Figure 2.
Figure 5:
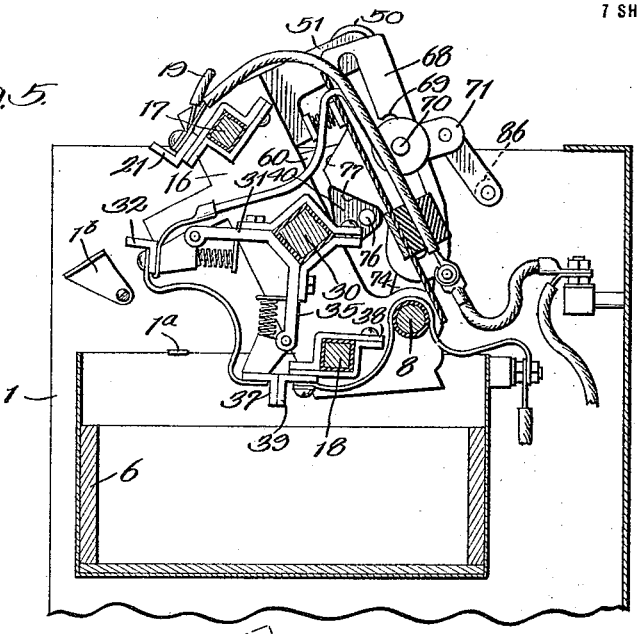
Figure 5 is a side elevation similar to Figure 2 showing the switch parts swung up out of the oil tank for purposes of inspection.
Figure 6:
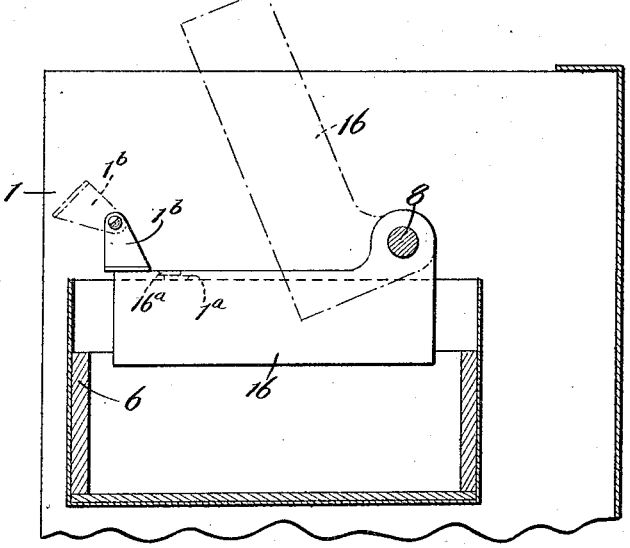
Figure 6 is similar to Figure 5, but omits the switch parts for the purpose of better showing the supporting frame in its two positions relatively to the oil tank.
Figure 7:
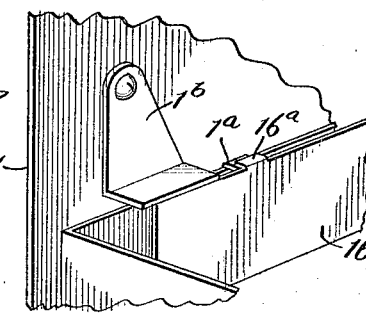
Figure 7 is a perspective view showing the lock for holding the pivoted frame down in active position with the switch contact immersed in the oil.

Referring to the particular embodiment selected to illustrate the principle of the invention, the casing 1 has a cover (not shown) and in the lower part contains the autotransformer 3, and the overload relays 4 and 5. An oil tank 6 is fastened in the casing above the transformer as shown in Figures 1 to 6. A rock shaft 8 is mounted horizontally in the casing, extending from side to side thereof just above the top of the tank. This shaft is operated by an operating handle 10. A spring 11, best shown in Figures 1, 3 and 4 constantly urges the handle toward initial position shown in said figures. One end of the spring overlies the handle while the other end engages the lug 12 fastened on the outside of the casing. This lug forms a stop for limiting the backward movement of the handle while another lug 13 forms a stop for limiting the forward movement of the handle. Loosely mounted on rock shaft 8 are four plates 16 shown in Figure 4 and elsewhere. These are rigidly fastened together by transverse bars 17, 18 which are squared so as to be non-rotatable relatively to the plates. These plates and bars constitute a frame pivotally supported on the rock shaft 8 thereby permitting the frame to be swung up so that the switch contacts may be inspected. When in normal position the front end of the frame is supported by means of lugs 16ª formed on the outer plates 16 and resting upon lugs 1ª extending inward from the side walls 1 of the main casing, as shown in perspective in Figure 7. Locks 1ᵇ are pivoted to the inside of the side-walls as shown in perspective in Figure 7, and when these are down they prevent the frame from being swung up. When the locks are rotated from the position shown in Figure 7 the frame may be lifted. It is desirable to provide a handle 19 at the front of the frame, see Figures 1, 2 and 5, whereby the frame and switches may be raised for inspection. The front bar 17 carries the stationary contacts 20 and 21 of the starting and running switches respectively. The rear bar 18 carries the stationary contacts 38 and 39 of the auxiliary switches. A shaft 25 is rotatably supported in the left pair of plates 16 and has rigidly fastened thereto the starting switch arms 26, provided at their ends with contacts 27 which engage the contacts 20. Similarly, a shaft 30 is rotatably supported in the right pair of plates 16 and has rigidly fastened thereto the running switch arms 31, provided at their ends with contacts 32 which engage the contacts 21. Shaft 30 also has rigidly fastened to it the auxiliary switch arms 34, 35 provided at their ends with contacts 36, 37 adapted to engage the stationary contacts 38, 39 fastened to bar 18. The parts are so arranged that when the arms of the running switch are in closed position, the arms of the auxiliary switch are in open position and vice versa.

Shaft 25 is operated by a plate 40 which is fastened to it. A spring 41 is fastened at one end to said plate and at the other end to a stationary rod 42. This spring tends to keep the starting switch open. The closure of the starting switch is effected by means of a link 44 adapted to engage the pin 45 projecting from the side of plate 40. Said link is actuated by an arm 47 rigidly fastened to rock shaft 8. The link and the arm are articulately connected by a pin 46 which also performs the function of a trip as hereinafter explained. Link 44 is longitudinally slotted to permit the operating handle to be rotated part way back to initial position while the starting switch remains closed. An arm 48 on the plate 40 serves to limit the movement of shaft 25 and arms 26 under the influence of spring 41. When the starting switch has reached closed position it is held there by a detent 50 which is pivoted at one end upon the projection 51 on plate 16. A spring 52 urges the free end of the detent upward. Said detent has a slot 53, at one end of which a shoulder 54 is formed. When the pin 45 moves forward and reaches the shoulder 54 the spring 52 causes the shoulder to engage the pin and hold the starting switch closed. The detent has a tail 55 in position to be engaged by pin 46 about the time the operating handle 10 returns to initial position, consequently as the handle reaches initial position on backward movement the pin 46 engages tail 55 and causes detent 50 to release pin 45, thus permitting spring 41 to rotate shaft 25 and swing the starting switch arms 26 to open position.

The shaft 30, which operates the running switch arms 31 and auxiliary switch arms 34 and 35 is operated by a plate 60 which is constantly urged by a spring 61 in a direction to open the switch. The lower end of the spring is attached to rod 42. An arm 64 is formed on plate 60 in position to strike the stationary bar 18 and limit the amount of rotation of shaft 30 under the influence of spring 61. The closure of the running switch is effected by means of a connector link 68, having a shoulder 69 adapted to engage a pin 70 projecting from the side of the arm 71 which forms a part of the plate 60. Said connector link is articulately connected to an arm 74 rigidly fastened to rock shaft 8. The parts are so arranged that when the operating handle 10 is rotated sufficiently forward the shoulder 69 will engage the pin 70 and close the running switch provided the holdout mechanism permits the connector link to act. This holdout mechanism consists of a pin 76 which underlies a cam 77 formed on the under side of the link. Pin 76 is carried by the plate 40 fastened to the starting switch, and the design is such that if the starting switch is closed, the pin 76 will be out of reach of cam 77, and hence the connector link will be able to engage the pin 70 and close the running switch. But if the starting switch is open, the pin 76 will occupy a position where the cam 77 will ride upon it and will cause the connector link in its forward movement to rise sufficiently to cause the shoulder 69 to clear the pin 70 and thus produce no effect upon it. It will thus be seen that the connector 68 cannot close the running switch unless the starting switch is closed.

When the running switch reaches closed position it is held there by a latch or detent 80, pivoted upon a pin 81 supported in a stationary frame 82. In the present design said frame is supported upon a bracket 83 fastened to the rear wall of the casing as best shown in Figure 2. Said detent is overbalanced so as to tend to assume acting position. It is provided with a hook, the front edge 85 whereof forms a cam located in position to be engaged by the anti-friction roller 86 formed at one end of a link 87. Said link is pivotally supported by the arm 71 of the plate 60 and has a spring 88 for urging its free end downward to engage the hook. As the link moves forward in the direction to close the running switch, it becomes engaged by the hook. The means which I have provided for holding this hooked detent in acting position are electromagnetic and consist in the present case of a winding 90 mounted in frame 82 in position to attract the armature 91 fastened to the rear end of the detent. The parts are so constructed that unless the winding 90 is sufficiently energized, the tension of the spring 61 will be sufficient to disengage the link 87 from the detent and permit the spring 61 to open the running switch. The winding 90 and detent 80 therefore, form parts of a low voltage release.

Now referring to the diagram, Figure 15, which shows the electric connections:

The generator 100 energizes the three line conductors 101, 102, and 103. The arms 26 of the starting switch move in unison to engage and disengage the stationary contacts 20, individually. The line conductor 101 is connected to one of said stationary contacts by a conductor 110. The line conductor 102 is connected to another of said stationary contacts by conductor 111, and the line conductor 103 is connected to the third stationary contact through a conductor 112. The autotransformer 3 has two coils 120 and 121. These coils are V connected and their ends are connected to the starting switch arms by the respective conductors 125, 126 and 127. The running switch arms 31 are adapted to engage the stationary contact 21 individually. The arms 34 and 35 of the auxiliary switch are adapted to engage respectively the contacts 38 and 39. Contact 38 is connected by a conductor 130 to an intermediate point on the coil 121. Contact 39 is connected by conductor 131 to an intermediate point on the coil 120. The motor 135 is connected to the three arms of the running switch by conductors 136, 137 and 138 respectively. The winding 90 is connected by a conductor 140 to the switch 35. The other end of the winding is connected by a conductor 141 to the contact 142 of the overload relay. A stationary contact 143 of this relay is connected to contact 142 by a normally closed switch 144, to which is attached a core 145, working in a coil 146, one end of which is connected by a conductor 148 to the line conductor 101. The other end of the coil is connected to one of the contacts 21. The apparatus is so designed that if the current in the coil 146 exceeds a predetermined maximum the switch 144 will open and break the circuit through the winding 90, thus releasing the detent 80 and permitting the running switch to open. In a similar manner, two stationary contacts 150 and 151 are bridged by a normally closed switch 152 having a core 153, working in a coil 154. One end of said coil is connected by conductor 112 to the line conductor 103 and the other end is connected to one of the contacts 21. Contacts 143 and 150 are connected together in the auxiliary circuit, and hence this switch also will open if the current becomes too great. Contact 151 is connected by a conductor 158 to a push button switch 159 which connects it to a conductor 160 and thence to the switch 34. By pushing this button, the auxiliary circuit may be opened, thus de-energizing the winding 90 and permitting the running switch to open. Thus the auxiliary circuit may be opened (and consequently the running switch caused to be opened) either manually by opening the push button switch or automatically in case the electrical values in the auxiliary circuit go either above or below preordained limits.

From the foregoing it will be evident that the switches are necessarily operated in their proper sequence and that a certain amount of delay must occur between the closure of the starting switch and the closure of the running switch. The operator must first move the operating handle forward far enough to completely close the starting switch, then move the handle backward to pick up the running switch and then move the handle forward an appreciable distance before the running switch is closed. To briefly repeat the operation: Starting with the parts in the position shown in Figure 13 the operator throws handle 10 forward. In doing so, link 77 rides up over the arm 76 and hence produces no effect to close the running switch contacts 32. The described forward motion of the handle, however, causes link 44 to rotate the plate 48 and bring the arm 45 over the notch 54, whereupon spring 52 presses detent 50 upward so that arm 45 is locked in forward position with the starting switch 27 closed. After this has been accomplished the operator permits handle 10 to come backward (anti-clockwise) part way (but not all the way) and as arm 76 is now in forward position it will not function to cause link 68 to move upward on the next forward movement of the handle, the consequence being that shoulder 69 engages pin 70 and rotates shaft 30 in a direction to close the running switch 32. The forward movement of plate 60 causes the clip 87 to be engaged by the hook 85 of the no-voltage release, the consequence being that so long as there is sufficient current the plate 60 will be held in forward position and the running switch closed. But when the operator takes his hand off of the handle 10 it will be automatically returned to the initial position shown in Figure 13 and in moving backward will cause the arm 46 to depress the tail 55 of the dog 50 and release the arm 45, thus permitting the spring 41 to move the starting switch to open position.

Attention is directed to my divisional patents, viz, system of motor control, No. 1,391,808, and switch mounting, No. 1,391,809.

Having thus described my invention what I claim as new and desire to secure by Letters Patent, is:

1. In combination, two electric switches, an oscillatory handle adapted to move forward and back, and mechanism actuated by said handle for causing said switches to be closed seriatim on different forward movements of said handle, said mechanism being adapted to permit the handle at all times to move forward to a position in which the second switch will be closed, and said mechanism on the first forward movement of the handle from initial position being adapted to close the first switch, and on the second forward movement of the handle to close the second switch provided said handle on its second forward movement starts from a point forward of the initial position of the handle but otherwise moves through substantially the same arc as before.

2. In combination, a first electric switch, a second electric switch, an operating handle, a detent for holding the first switch in acting position, a connector for connecting the handle to the second switch, and means controlled by the position of the first switch for determining whether or not said connector shall connect the handle to the second switch.

3. Mechanism of the class described having a first and a second electric switch, an operating handle adapted when moved forward to move the first switch to acting position, a detent for holding said first switch in acting position, a connector for connecting the handle to the second switch whereby said handle when moved in the proper direction shall move the second switch to acting position, and means determined by the position of the first switch for determining whether or not said connector shall become operative.

4. In combination, a first electric switch, a second electric switch, an operating handle adapted to close the first switch, a detent for holding the first switch closed, a connector for connecting the handle to the second switch, whereby when said handle is moved in the proper direction it will close the second switch, and means actuated by the first switch for rendering the connector inoperative, whereby the handle will not close the second switch unless the first switch is in closed position.

5. In combination, a first electric switch, a second electric switch, an operating handle adapted when moved forward to move the first switch to acting position, a detent for holding the first switch in acting position after it has been moved there by the handle, a connector for connecting the handle to the second switch when the handle is moved backward, said connector, when acting, causing the handle when moved in the proper direction, to move the second switch to acting position, and means controlled by the first switch for suspending the action of the connector, whereby the handle is incapable of closing the second switch unless the first switch is in acting position.

6. In combination, a first electric switch, a second electric switch, an operating handle adapted when moved forward to move the first switch to acting position, a detent for holding the first switch in acting position after it has been moved there by the handle, a connector adapted upon the backward movement of the handle to establish connection between the handle and the second switch unless positively prevented, whereby when the connector is acting, a subsequent movement of the handle may move the second switch to acting position, and means moving in harmony with the first switch for positively preventing the connector from acting unless the first switch is in acting position.

7. In mechanism of the class described, two electric switches, an operating handle having at least three increments of effective movement, the first increment causing the first switch to move to acting position, a detent for holding the first switch in acting position, a connector adapted to connect the handle to the second switch upon the completion of the second increment of movement of the handle, whereby the third increment of movement of the handle may move the second switch to acting position, and means moving in harmony with the first switch for preventing the connector from connecting the handle to the second switch unless the first switch is in acting position.

8. In mechanism of the class described, two electric switches, an operating handle having at least three increments of effective movement, the first increment causing the first switch to move to acting position, a detent for holding the first switch in acting position, a connector actuated by the handle and moved by it during its second increment of movement to position the connector relatively to the second switch, and means moved by the first switch for preventing the connector from functioning unless the first switch is in acting position, said connector if permitted to function, engaging the second switch upon the completion of the second increment of the movement of the handle, and the third increment of movement of the handle causing the connector, if permitted to function, to move the second switch to acting position.

9. A switch operating mechanism having a first electric switch, a second electric switch, an operating handle having at least three increments of effective movement, the first increment causing the first switch to move to acting position, a detent for holding the first switch in acting position, an arm articulately connected to the handle and adapted to engage the second switch for moving it to acting position during the third increment of movement of the handle, and a holdout operating in unison with the first switch for holding said arm out of engagement with the second switch except when the first switch is in acting position, said holdout permitting said arm to engage the second switch during the second increment of movement of the handle provided the first switch is in acting position.

10. In mechanism of the class described, two electric switches, an operating handle having at least three increments of effective movement, the first increment causing the first switch to move to acting position, a detent for holding the first switch in acting position, a connector actuated by the handle and moved by it during its second increment of movement to position the connector relatively to the second switch, and means moved by the first switch for preventing the connector from functioning unless the first switch is in acting position, said connector if permitted to function, engaging the second switch upon the completion of the second increment of movement of the handle, and the third increment of movement of the handle causing the connector, if permitted to function, to move the second switch to acting position, the second increment of movement of the operating handle being in the opposite direction to the first increment.

11. A switch operating mechanism having a first electric switch, a second electric switch, an operating handle having at least three increments of effective movement, the first increment causing the first switch to move to acting position, a detent for holding the first switch in acting position, an arm articulately connected to the handle and adapted to engage the second switch for moving it to acting position during the third increment of movement of the handle, and a holdout operating in unison with the first switch for holding said arm out of engagement with the second switch except when the first switch is in acting position, said holdout permitting said arm to engage the second switch during the second increment of movement of the handle provided the first switch is in acting position, the first and third increments of movement of the handle being in the same direction and the second increment in the opposite direction.

12. A switch operating mechanism having a first electric switch, a second electric switch, an operating handle having at least three increments of effective movement, the first increment causing the first switch to close a detent for holding the first switch closed, an arm articulately connected to the handle and adapted to engage the second switch for closing it to acting position during the third increment, and a support connected to the first switch for holding said arm out of engagement with the second switch except when the first switch is closed, said arm riding upon said support and thus being held ineffective when the first switch is open, and said support being out of reach of the arm when the first switch is closed.

13. Apparatus for controlling an electric motor comprising two switches, an actuating element adapted to move forward and back, mechanism operative on the forward movement of the actuating element for picking up and closing the first switch, means for holding the first switch closed while the actuating element moves partway back, and means operative only on the forward portion of the second forward movement of the actuating element for picking up the second switch and closing it, the apparatus being adapted to permit, at all times, the actuating element to be moved forward sufficiently to close the second switch.

14. In combination, an electric switch tending to move to non-operating position, said switch having an arm extending from it by which it is operated, a detent adapted to engage said arm to hold the switch in operating position, an operating handle, a link actuated by said handle when said handle is moved forward from initial position and adapted to engage said arm to move it and the switch to operating position where it will be held by said detent, there being lost motion between the link and the arm for permitting the handle to move backward after the arm has been engaged by the detent, and means actuated by said handle for tripping said detent as the handle reaches initial position.

15. Switch operating mechanism comprising a first switch, a second switch tending to move to inoperative position, an arm for operating the second switch, an operating handle, a connector actuated by said handle and adapted to operate said arm to move the second switch to operating position when the handle is moved forward, a holdout for preventing the connector from operating the arm, said holdout being connected to and operated by the first switch, the holdout assuming inoperative position when the first switch is in operating position, and vice versa.

16. A compensator for motor starters comprising a starting switch, a running switch tending to move to open position, an arm for closing the running switch, an operating handle, a connector link actuated by said handle and adapted to operate said arm for moving the running switch to closed position, said link having a controlling cam; and a holdout arm moving in unison with the starting switch, said holdout arm being in acting position to prevent the connector from operating when the starting switch is open, and being in non-acting position to permit the connector to operate and move the running switch to closed position when the starting switch is in closed position.

17. A compensator having a starting switch and a running switch, both tending to move to open position, a detent for holding the starting switch open, a second detent for holding the running switch closed, an operating handle adapted when moved forward to close said switches, and means for tripping the first detent and thereby permitting the starting switch to open when the operating handle approaches initial position during its backward movement.

18. In combination two electric switches, an operating handle adapted in moving forward from initial position to close the first switch, a detent for holding the first switch closed, a connector actuated by said handle and adapted to close the second switch as the handle moves forward from a point slightly forward of the initial position thereof, said connector being adapted to be held inoperative by the first switch except when the first switch is in closed position.

19. Motor starting apparatus having a normally open starting switch, a normally open running switch, a normally closed auxiliary switch, a starting circuit which includes both the starting switch and the auxiliary switch, and which is open when either the starting switch or the running switch is open, a running circuit which includes the running switch, and means having a single operating handle adapted to close the starting switch when the handle is moved forward, then hold the starting switch closed while the handle is moved part way backward, then open the auxiliary switch and close the running switch as the handle is again moved forward.

20. A motor starter comprising a starting switch, a running switch, an operating handle adapted to close said switches in the sequence in which they are mentioned, as the handle moves forward from initial position, the running switch being adapted to remain closed independently of the operating handle, and means controlled by said handle for opening the starting switch as the handle approaches initial position on its return.

21. A motor starter having a starting switch, a running switch, an operating handle, links actuated by said handle, a starting arm actuated by one of said links and adapted to close the starting switch, said starting switch being adapted to maintain itself in closed position, a running arm actuated by the second link for closing the running switch, means for maintaining the running switch closed independently of the handle, and means controlled by the handle for opening the starting switch as the handle reaches initial position on its return journey.

22. A motor starter having a starting switch, a running switch, an operating handle swinging forward and back, links actuated by said handle, a starting arm actuated by one of said links and adapted to close the starting switch as the handle moves forward, a detent for maintaining the starting switch in closed position independently of the handle, a running arm actuated by the second link for closing the running switch as the handle moves forward, means for maintaining the running switch closed independently of the handle, a spring tending to open the starting switch, and means actuated by the handle as it approaches initial position on its return journey for causing said detent to release the starting switch and permit it to open.

23. A motor starter having a starting switch, a running switch, an operating handle, links actuated by said handle, for closing first the starting switch and then the running switch as the handle moves forward, and a detent for holding the starting switch closed to thereby permit the handle to move backward to enable the second link to engage the running switch for closing it upon the second forward movement of the handle.

24. A motor starter having a starting switch, a running switch, an operating handle, links actuated by said handle for closing the switches is sequence, a detent for holding the starting switch closed and thereby permitting the handle to move part way backward to enable the second link to engage the running switch for closing it upon the second forward movement of the handle and a holdout positioned by the starting switch for preventing the second link from closing the running switch unless the starting switch is in closed position.

25. A motor starter having a starting switch, a running switch, an operating handle, a rock shaft operated by said handle, arms extending from said rock shaft, links actuated by said arms, one of said links being adapted to close the starting switch when the handle is moved forward, a detent for holding the starting switch closed thereby to permit the handle to be moved part way backward to enable the second link to close the running switch upon the second forward movement of the handle, a holdout for preventing the second link from closing the running switch unless the starting switch is in closed position, and means for holding the running switch closed.

26. A motor starter having a starting switch, a running switch, an operating handle, a rock shaft operated by said handle, arms extending from said rock shaft, links actuated by said arms, one of said links being adapted to close the starting switch when the handle is moved forward, a detent for holding the starting switch closed thereby to permit the handle to be moved part way backward to enable the second link to close the running switch upon the second forward movement of the handle, a holdout for preventing the second link from closing the running switch unless the starting switch is in closed position, means for holding the running switch closed independently of the handle to thereby permit the handle to return to initial position, and means actuated by said handle for releasing said detent and thereby permitting the starting switch to open as the handle approaches initial position.

27. A motor starter comprising two independent switches, one, the starting switch, and the other the running switch, an operating handle, a rock shaft operated by said handle, arms extending from said rock shaft, links connected to said arm, a starting arm actuated by one of said links for moving the starting switch to operating position, a running arm actuated by the other of said links for moving the running switch to operating position, means controlled by said rock shaft for returning the starting switch to inoperative position as the handle approaches initial position, and a holdout for preventing the running arm to be engaged by its link unless the starting switch is in operating position.

28. In combination, two electric switches, the first of which is biased toward closed position, an operating handle adapted in moving forward from initial position to close the first switch, a detent for holding the first switch closed, a connector actuated by said handle and adapted to close the second switch as the handle moves forward from a point slightly forward of the initial position thereof, said connector being adapted to be held inoperative by the first switch except when the first switch is in closed position, and means operated by the handle as it approaches initial position on its rearward movement for causing said detent to release the first switch.

29. In a starter for electric motors, a starting switch, a running switch, an oscillatory handle adapted to move forward and back, mechanism operative on the forward movement of the handle for picking up the starting switch for closing it, means for holding the starting switch closed while the handle is moved part way backward, and means operative on the second forward movement of the handle for picking up the running switch and closing it.

30. In a starter for electric motors, a starting switch, a running switch, an oscillatory handle adapted to move forward and back, mechanism operative on the forward movement of the handle for picking up the starting switch for closing it, means for holding the starting switch closed while the handle is moved part way backward, means for releasing the starting switch on the last part of the backward movement of the handle, and means operative on the second forward movement of the handle for picking up the running switch and closing it, provided the operating handle is moved only part way backward after its initial forward movement.

31. A motor starter having a first switch and a second switch, a pivoted handle adapted to travel forward and backward through a limited arc, means actuated by the handle on its initial forward movement for closing the first switch, means for automatically holding the first switch closed when the handle has moved forward through the major portion of its arc of travel, said means being adapted to hold the first switch closed while the handle returns through an arc less than the arc of forward movement, and means actuated by the handle in again moving forward through a portion of the same arc as on the initial forward movement for picking up the second switch and closing it.

32. In combination, two electric switches which are spring pressed toward open position, an oscillatory handle adapted to move forward and back from an initial to a final position, mechanism actuated by said handle for causing said switches to be closed seriatim on different forward movements of said handle, said mechanism having means for closing the first switch on the initial forward movement of the handle, a positive lock adapted to automatically lock the first switch closed upon the arrival of the latter at closed position, and pick-up means adapted to pick up the second switch when the first switch is closed and the handle is moved partway back after the first forward movement, said pick-up means being adapted to close the second switch on the second forward movement of the handle from a partially advanced position.

33. In combination, two electric switches which are spring pressed toward open position, an oscillatory handle adapted to move forward and back from an initial to a final position, mechanism actuated by said handle for causing said switches to be closed seriatim on different forward movements of said handle, said mechanism having means for closing the first switch on the initial forward movement of the handle, a positive lock adapted to automatically lock the first switch closed upon the arrival of the latter at closed position, pick-up means adapted to pick up the second switch when the first switch is closed, and the handle is moved partway back after the first forward movement, said pick-up means being adapted to close the second switch on the second forward movement of the handle from a partially advanced position, a detent adapted to hold the second switch closed when the latter arrives at closed position, and means for unlocking said lock, the latter means being adapted to be moved to non-acting position by the handle as the latter approaches initial position on its return movement.

In witness whereof, I have hereunto subscribed my name.

HERMON L. VAN VALKENBURG.